(12) United States Patent
Yamaya et al.

(10) Patent No.: US 7,842,753 B2
(45) Date of Patent: Nov. 30, 2010

(54) COMPOSITE RESIN, COATING COMPOSITION CONTAINING SUCH RESIN, AND COATED ARTICLE

(75) Inventors: Masaaki Yamaya, Annaka (JP); Kazuharu Sato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 521 days.

(21) Appl. No.: 11/783,852

(22) Filed: Apr. 12, 2007

(65) Prior Publication Data

US 2007/0243395 A1      Oct. 18, 2007

(30) Foreign Application Priority Data

Apr. 14, 2006   (JP) .............................. 2006-112095

(51) Int. Cl.
*C08L 83/04*  (2006.01)
(52) U.S. Cl. ........................................ 524/858; 528/42
(58) Field of Classification Search .................. 524/858; 528/42

See application file for complete search history.

(56) References Cited

U.S. PATENT DOCUMENTS

2004/0209084 A1*  10/2004  Yamaya et al. ............... 428/421
2006/0240268 A1   10/2006  Yamaya et al.
2006/0269733 A1   11/2006  Mizuno et al.

FOREIGN PATENT DOCUMENTS

| JP | 02-248480   |   | 4/1990 |
|----|-------------|---|--------|
| JP | 7-133105    | A | 5/1995 |
| JP | 08-157643   |   | 6/1996 |
| JP | 2000-119634 | A | 4/2000 |
| JP | 2001-233611 | A | 8/2001 |
| JP | 2002-79616  | A | 3/2002 |
| JP | 2004-272197 | A | 9/2004 |
| JP | 2004-315712 | A | 11/2004 |
| JP | 2005-99778  | A | 4/2005 |
| JP | 2005-266051 | A | 9/2005 |

\* cited by examiner

*Primary Examiner*—Kuo-Liang Peng
(74) *Attorney, Agent, or Firm*—Birch Stewart Kolasch & Birch, LLP

(57) ABSTRACT

A composite resin is produced by hydrolyzing and condensing a silane compound (2) containing a bissilane compound (B) represented by:

$$X_nR_{3-n}Si\text{—}Y\text{—}SiR_{3-n}X_n \qquad (B)$$

wherein Y is a divalent organic group which is optionally substituted with a fluorine atom or a divalent organic group which optionally contains an aromatic ring, R is a monovalent organic group, X is OH group or a hydrolyzable group, and n is 1, 2, or 3; in the presence of (1) porous and/or hollow inorganic oxide fine particles (A); and which is an integral mixture of component (1) and component (2) which has undergone the hydrolysis and the condensation. The composite resin has voids in the resin since it contains porous and/or hollow inorganic oxide fine particles, and the composite resin can also be formed into a cured article or a cured coating with a reduced refractive index since it contains air which has the lowest refractive index.

14 Claims, No Drawings

COMPOSITE RESIN, COATING COMPOSITION CONTAINING SUCH RESIN, AND COATED ARTICLE

CROSS-REFERENCE TO RELATED APPLICATION

This non-provisional application claims priority under 35 U.S.C. §119(a) on Patent Application No. 2006-112095 filed in Japan on Apr. 14, 2006, the entire contents of which are hereby incorporated by reference.

TECHNICAL FIELD

This invention relates to a novel composite resin produced by hydrolyzing and condensing a silane compound (2) containing a bissilane compound (B) in the presence of (1) porous and/or hollow inorganic oxide fine particles (A), and which is an integral mixture of component (1) and component (2), a coating composition containing such composite resin and an organic solvent, and an article coated with such coating composition.

BACKGROUND OF THE INVENTION

Recently, an optical component such as a display of a computer, TV, or plasma display, a liquid crystal display, transparent plastic lens, cover of various meters, and window of an automobile or train is often provided with an antireflection coating as its outermost layer in order to improve visibility. Because of the principle of the antireflection, an antireflection coating should have a low refractive index.

A fluororesin is a material which inherently has a low refractive index and a high alkali resistance, and therefore, it has also been used in displays for antireflection purpose. However, because of its molecular structure, fluororesin is more often used as a rubber material, and its use as a coating agent capable of providing a rigid protective coating having an excellent scratch resistance has been difficult.

With the recent development of hydrolyzable silane compound having a perfluoroalkyl group, various coating agent capable of realizing excellent alkali resistance, water repellency, oil repellency, smudge proof property, antireflection property, and the like have been developed by utilizing the characteristic feature of the resin. However, since the perfluoroalkyl group which realizes such characteristic feature is bulky and inactive, the cured coating suffered from low crosslink density, and as a consequence, the scratch resistance was still insufficient even though the coating was considerably harder than the fluororesin.

In order to improve the scratch resistance, JP-A 2000-119634 (Patent Document 1) proposes a method in which various silane compounds including perfluoroalkyl group-containing silanes and tetra alkoxysilanes are simultaneously hydrolyzed; and JP-A 2000-119634 (Patent Document 1) proposes a material containing a bissilane compound as its main component wherein the bissilane compound contains a perfluoroalkylene group as its spacer. While adhesion of acceptable level has been realized in these attempts, antireflection property has still been insufficient since refractive index has not been fully reduced.

The material which has the lowest refractive index is air, and in order to incorporate such air in the structure of the cured material, use of inorganic fine particles having voids in its interior has been contemplated, and JP-A 7-133105 and JP-A 2001-233611 (Patent Documents 3 and 4) propose porous and hollow silica sols. JP-A 2002-79616 (Patent Document 5) proposes a method in which such material is used by mixing with a silicone containing a fluorine-substituted alkyl group, and JP-A 2004-272197 (Patent Document 6) attempts a method in which such material is used by dispersing in a binder component containing an ionization radiation-curable monomer. When the inventors of the present invention confirmed such method, the hollow silica sol could be homogeneously mixed with the solution of such binder in an organic solvent. However, after the volatilization of the organic solvent, floating of the hollow silica sol containing voids in its interior toward the surface of the coating was observed. As a consequence, despite the favorable antireflection property of the entire cured coating, the cured coating did not have sufficient scratch resistance since a large amount of hollow silica particles having hollow structure and inferior strength were present on the surface of the coating, and also, immobilization of such particles by the binder component was insufficient. The coating was also found to have insufficient alkali resistance due to the inferior alkali resistance of the silica component.

In order to obviate the drawbacks of the hollow silica sol, JP-A 2005-266051 (Patent Document 7) attempts use of a hollow silica sol which has been surface treated with a silane compound containing a fluorine-substituted alkyl group by mixing and dispersing the surface treated hollow silica sol in a binder derived from a tetraalkoxysilane. In this case, the alkali resistance has been improved since the surface has been covered with a hydrophobic group. The scratch resistance, however, is not improved because the hollow silica particles are merely mixed with the binder and floating of the hollow silica particles has not been prevented. JP-A 2005-99778 (Patent Document 8) discloses an attempt to disperse a hollow silica sol which has been surface treated with a silane compound containing an ionizing radiation-curable group in an ionizing radiation-curable resin. In this case, while the binder becomes bonded to the particles upon curing, the problem of floating before the curing has not been prevented and the scratch resistance has still been insufficient.

As described above, there has been no coating agent which has realized high level scratch resistance simultaneously with the antireflection property.

SUMMARY OF THE INVENTION

The present invention has been completed in view of the situation as described above, and an object of the present invention is to provide a composite resin having excellent scratch resistance simultaneously with low refractive index and antireflection property, a coating composition containing such composite resin, and an article having a coating of such coating composition.

The inventors of the present invention have made an intensive study and found that when inorganic oxide fine particles having voids in the interior and a hydrolysate of a bissilane compound having a particular structure are integrated as a composite resin, homogeneous dispersion in the cured coating can be realized without floating of the inorganic oxide fine particles having voids in the interior, and excellent mechanical strength (scratch resistance) can be realized simultaneously with the low refractivity (antireflection property) compared to the case of simple mixing of such components. The present invention has been completed on the bases of such finding.

Accordingly, the present invention provides a composite resin, a coating composition, and a coated article as described below.

[1] A composite resin which has been produced by hydrolyzing and condensing a silane compound (2) containing a bissilane compound (B) represented by:

$$X_nR_{3-n}Si—Y—SiR_{3-n}X_n \quad (B)$$

wherein Y is a divalent organic group which is optionally substituted with a fluorine atom or a divalent organic group which optionally contains an aromatic ring, R is a monovalent organic group, X is OH group or a hydrolyzable group, and n is 1, 2, or 3; in the presence of (1) porous and/or hollow inorganic oxide fine particles (A); and
which is an integral mixture of component (1) and component (2) which has undergone the hydrolysis and the condensation.
[2] A composite resin according to the above [1] wherein the inorganic oxide fine particles (A) contain SiO2 as a main component.
[3] A composite resin according to the above [1] or [2] wherein the inorganic oxide fine particles (A) have an average particle diameter of 1 to 100 nm.
[4] A composite resin according to the above [1], [2], or [3] wherein the bissilane compound (B) is the one represented by the following formula:

$$(CH_3O)_3Si—CH_2CH_2—C_mF_{2m}—CH_2CH_2—Si(OCH_3)_3$$

wherein m is an integer of 2 to 20.
[5] A composite resin according to any one of the above [1] to [4] wherein
the bissilane compound (B), and
a silane compound represented by the following general formula (C):

$$F(CF_2)_aC_2H_4—SiR_{3-b}X_b \quad (C)$$

wherein R and X are as described above, a is 4, 6, 8, 10, or 12, and b is 2 or 3
are simultaneously hydrolyzed and condensed in the presence of an inorganic oxide fine particles (A).
[6] A coating composition comprising a composite resin of any one of the above [1] to [5] and an organic solvent.
[7] A coated article having the coating composition of the above [6] coated as its outermost layer.

EFFECTS OF THE INVENTION

The composite resin of the present invention has voids in the resin since it contains porous and/or hollow inorganic oxide fine particles, and the composite resin of the present invention can also be formed into a cured article or a cured coating with reduced refractive index since it contains air which has the lowest refractive index. The composite resin of the present invention also has excellent scratch resistance since the component (1) and the hydrolysis and condensation product of the component (2) are integrated, and the article or the coating after the curing has high homogeneity and excellent hardness. Accordingly, the composite resin of the present invention is highly adapted for use in an optical component which is required to have the antireflection property simultaneously with the scratch resistance such as a display of a computer, TV, or plasma display, a polarizing plate in liquid crystal display, transparent plastic lens, cover of various meters, window of an automobile or train, and the like.

DETAILED DESCRIPTION OF THE INVENTION

The composite resin of the present invention is a composite resin produced by hydrolyzing and condensing (2) an organosilicon compound containing a bissilane compound (B) in the presence of (1) porous and/or hollow inorganic oxide fine particles (A), and it comprises an integral mixture of component (1) and component (2) which has experienced the hydrolyzation and the condensation.

The porous and/or hollow inorganic oxide fine particles which is the first component may be the one known in the art. In order to realize greater decrease in the refractive index, the inorganic oxide fine particles should have a higher void percentage, and in view of the higher void percentage, use of the one having an outer shell and a hollow interior is preferable. The inorganic material constituting such inorganic oxide fine particles may be a metal oxide of Si, Ti, Zn, Sb, Y, La, Zr, Al, In, Sn, Ce, Fe, or the like. In view of reducing the refractive index, the metal oxide is preferably an oxide of Si, and in particular, the one containing SiO2 as its main component.

Exemplary such fine particles having voids include the composite oxide sol or the hollow silica fine particles disclosed in JP-A 7-133105, JP-A 2001-233611, and the like. The inorganic oxide fine particles having voids may preferably have a refractive index in the range of 1.20 to 1.44.

The inorganic oxide fine particles may preferably have an average particle diameter of 1 to 100 nm, more preferably 5 to 80 nm, and more preferably 30 to 60 nm. When the average particle diameter is below such range, the particles may become unstable since they are more likely to experience aggregation. When the average particle diameter is in excess of such range, the coating after the curing may experience loss of transparency. The inorganic oxide fine particles have an outer shell having a void defined in its interior, and the shell of such fine particles preferably has a thickness in the range of 0.1 to 30 nm, and in particular, 1 to 20 nm. When the outer shell has a thickness below such range, formation of a consistent layer will be difficult, and holes are likely to be formed in the shell detracting from the sufficient strength. In addition, since the void is filled with the resin, there is some risk of decrease in the refractive index. When the thickness is in excess of such range, void percentage will be reduced, and the effect of reducing the refractive index may become insufficient.

The average particle diameter can be determined by Coulter counter method using an electron micrograph (including the measurement of the void part using the cross section).

In order to improve crosslinking ability with the binder derived from the bissilane having the particular structure as described below, surface treatment of the inorganic oxide fine particles by Si, Ti, or Al coupling agent should preferably be avoided.

Such inorganic oxide fine particles are preferably used by dispersing in water or an organic solvent. Exemplary organic solvents include alcohols such as methanol, ethanol, propyl alcohol, isopropyl alcohol, n-butyl alcohol, isobutyl alcohol, sec-butyl alcohol, t-butyl alcohol, and diacetone alcohol; glycol ethers such as ethylene glycol monomethyl ether, ethylene glycol monoethyl ether, propylene glycol monomethyl ether, propylene glycol monoethyl ether, and propylene glycol monomethyl ether acetate; ethers such as dioxane and tetrahydrofuran; ketones such as acetone, methyl ethyl ketone, methyl isobutyl ketone, cyclohexanone, and acetyl acetone; esters such as ethyl acetate, butyl acetate, and ethyl acetoacetate; xylene; and toluene.

Next, the second component which is the organosilicon compound integrated with the porous or hollow inorganic oxide fine particles as described above is described. The bissilane compound (B) which is the critical component can be represented by the following general formula:

$$X_nR_{3-n}Si—Y—SiR_{3-n}X_n \quad (B)$$

wherein Y is a divalent organic group which is optionally substituted with fluorine atom or a divalent organic group which optionally contains an aromatic ring, R is a monovalent organic group, X is OH group or a hydrolyzable group, and n is 1, 2, or 3.

As described above, Y is a divalent organic group which is optionally substituted with fluorine atom or a divalent organic group which optionally contains an aromatic ring. More specifically, Y is a divalent hydrocarbon group such as a straight chain, branched, or cyclic alkylene group containing 1 to 10 carbon atoms, and in particular, 1 to 6 carbon atoms such as —CH$_2$—, —C$_2$H$_4$—, —C$_4$H$_8$—, —C$_6$H$_{12}$—, and —C$_6$H$_{10}$—; a fluorine-containing divalent hydrocarbon group such as a fluorine-containing straight chain, branched, or cyclic alkylene group containing 6 to 20 carbon atoms, and in particular, 6 to 16 carbon atoms such as —C$_2$H$_4$—(CF$_2$)$_4$—C$_2$H$_4$—, —C$_2$H$_4$—(CF$_2$)$_6$—C$_2$H$_4$—, —C$_2$H$_4$—(CF$_2$)$_8$—C$_2$H$_4$—, —C$_2$H$_4$—(CF$_2$)$_{10}$—C$_2$H$_4$—, —C$_2$H$_4$—(CF$_2$)$_{12}$—C$_2$H$_4$—, and —C$_2$H$_4$—(CF$_2$)$_{16}$—C$_2$H$_4$—; an arylene group such as the one containing 6 to 20 carbon atoms, and in particular, 6 to 10 carbon atoms such as —C$_6$H$_4$—, —CH$_2$—C$_6$H$_4$—CH$_2$—, and —C$_2$H$_4$—C$_6$H$_4$—C$_2$H$_4$—; and an aromatic ring-containing divalent hydrocarbon group such as a group formed by the binding of an arylene group and an alkylene group. Among these, the preferred are the fluorine-substituted divalent hydrocarbon group represented by the general formula:

$$—CH_2CH_2—C_mF_{2m}—CH_2CH_2—$$

wherein m is 2 to 20 in view of the hardness of the coating after the curing and the effect of reducing the refractive index.

When m is 1, water repellency will be insufficient, and sufficient reduction in the refractive index may not be achieved. On the other hand, when m is in excess of 20, crosslink density will be insufficient and the cured coating will be soft, and there would be some risk that the intended scratch resistance is not realized. In addition, the silane compound will have a considerably increased boiling point, and purification will be difficult detracting from the economical advantage. The chain length of the perfluoroalkylene group is preferably in the range of 4 to 12, and most preferably in the range of 4 to 8.

R represents a monovalent organic group such as straight chain, branched, or cyclic alkyl group, for example, methyl, ethyl, butyl, hexyl, or cyclohexyl group, or an aryl group such as phenyl group, and preferably, R is the one containing 1 to 10 carbon atoms.

X represents OH group, a halogen atom, an alkoxy group, an acyloxy group, or an alkenoxy group containing 1 to 4 atoms, or —NCO group. Exemplary such groups include OH group, halogen atoms such as Cl, alkoxy groups such as methoxy group, ethoxy group, propoxy group, isopropoxy group, and butoxy group, alkenoxy groups such as isopropenoxy group, acyloxy groups such as acetoxy group, ketoxime groups such as methyl ethyl ketoxime group, alkoxyalkoxy group such as methoxyethoxy group, and —NCO group. The preferred are silane compounds having methoxy group or ethoxy group in view of the handling convenience and ease of controlling the reaction in the hydrolysis.

n which represents the number of group X capable of undergoing siloxane crosslinking may be any one of 1, 2, and 3. However, n is preferably 2 or 3 in view of the curing ability.

In order to increase crosslink density to thereby improve scratch resistance to a favorable level, n is preferably 3.

Examples of the bissilane compound satisfying the conditions as described above include
(CH$_3$O)$_3$Si—C$_2$H$_4$—Si(OCH$_3$)$_3$,
(CH$_3$O)$_3$Si—C$_6$H$_{12}$—Si(OCH$_3$)$_3$,
(CH$_3$O)$_2$(CH$_3$)Si—C$_2$H$_4$—Si(CH$_3$)(OCH$_3$)$_2$,
(CH$_3$O)(CH$_3$)$_2$Si—C$_2$H$_4$—Si(CH$_3$)$_2$(OCH$_3$),
(C$_2$H$_5$O)$_3$Si—C$_2$H$_4$—Si(OC$_2$H$_5$)$_3$,
Cl$_3$Si—C$_2$H$_4$—SiCl$_3$,
(CH$_3$COO)$_3$Si—C$_2$H$_4$—Si(OCOCH$_3$)$_3$,
(CH$_3$O)$_3$Si—C$_6$H$_4$—Si(OCH$_3$)$_3$,
(CH$_3$O)$_2$(CH$_3$)Si—C$_6$H$_4$—Si(CH$_3$)(OCH$_3$)$_2$,
(CH$_3$O)(CH$_3$)$_2$Si—C$_6$H$_4$—Si(CH$_3$)$_2$(OCH$_3$),
(CH$_3$O)$_3$Si—C$_2$H$_4$—C$_6$H$_4$—C$_2$H$_4$—Si(OCH$_3$)$_3$,
(CH$_3$O)$_2$(CH$_3$)Si—C$_2$H$_4$—C$_6$H$_4$—C$_2$H$_4$—Si(CH$_3$)(OCH$_3$)$_2$,
(CH$_3$O)(CH$_3$)$_2$Si—C$_2$H$_4$—C$_6$H$_4$—C$_2$H$_4$—Si(CH$_3$)$_2$(OCH$_3$),
(CH$_3$O)$_3$Si—C$_2$H$_4$—(CF$_2$)$_2$—C$_2$H$_4$—Si(OCH$_3$)$_3$,
(CH$_3$O)$_3$Si—C$_2$H$_4$—(CF$_2$)$_4$—C$_2$H$_4$—Si(OCH$_3$)$_3$,
(CH$_3$O)$_3$Si—C$_2$H$_4$—(CF$_2$)$_6$—C$_2$H$_4$—Si(OCH$_3$)$_3$,
(CH$_3$O)$_3$Si—C$_2$H$_4$—(CF$_2$)$_8$—C$_2$H$_4$—Si(OCH$_3$)$_3$,
(CH$_3$O)$_3$Si—C$_2$H$_4$—(CF$_2$)$_{10}$—C$_2$H$_4$—Si(OCH$_3$)$_3$,
(CH$_3$O)$_3$Si—C$_2$H$_4$—(CF$_2$)$_{12}$—C$_2$H$_4$—Si(OCH$_3$)$_3$,
(CH$_3$O)$_3$Si—C$_2$H$_4$—(CF$_2$)$_{16}$—C$_2$H$_4$—Si(OCH$_3$)$_3$,
(CH$_3$O)$_3$Si—C$_2$H$_4$—(CF$_2$)$_{20}$—C$_2$H$_4$—Si(OCH$_3$)$_3$,
(C$_2$H$_5$O)$_3$Si—C$_2$H$_4$—(CF$_2$)$_4$—C$_2$H$_4$—Si(OC$_2$H$_5$)$_3$,
(C$_2$H$_5$O)$_3$Si—C$_2$H$_4$—(CF$_2$)$_6$—C$_2$H$_4$—Si(OC$_2$H$_5$)$_3$,
(C$_3$H$_7$O)$_3$Si—C$_2$H$_4$—(CF$_2$)$_4$—C$_2$H$_4$—Si(OC$_3$H$_7$)$_3$,
(C$_3$H$_7$O)$_3$Si—C$_2$H$_4$—(CF$_2$)$_6$—C$_2$H$_4$—Si(OC$_3$H$_7$)$_3$,
(CH$_3$O)$_2$(CH$_3$)Si—C$_2$H$_4$—(CF$_2$)$_4$—C$_2$H$_4$—Si(CH$_3$)(OCH$_3$)$_2$,
(CH$_3$O)$_2$(CH$_3$)Si—C$_2$H$_4$—(CF$_2$)$_6$—C$_2$H$_4$—Si(CH$_3$)(OCH$_3$)$_2$,
(CH$_3$O)$_2$(C$_6$H$_5$)Si—C$_2$H$_4$—(CF$_2$)$_4$—C$_2$H$_4$—Si(C$_6$H$_5$)(OCH$_3$)$_2$, and
(CH$_3$O)$_2$(C$_6$H$_5$)Si—C$_2$H$_4$—(CF$_2$)$_6$—C$_2$H$_4$—Si(C$_6$H$_5$)(OCH$_3$)$_2$.

Among these, the bissilane compounds preferable for use include:
(CH$_3$O)$_3$Si—C$_2$H$_4$—(CF$_2$)$_4$—C$_2$H$_4$—Si(OCH$_3$)$_3$,
(CH$_3$O)$_3$Si—C$_2$H$_4$—(CF$_2$)$_6$—C$_2$H$_4$—Si(OCH$_3$)$_3$, and
(CH$_3$O)$_3$Si—C$_2$H$_4$—(CF$_2$)$_8$—C$_2$H$_4$—Si(OCH$_3$)$_3$.

In the organosilicon compound containing the bissilane compound which is the component (2) of the present invention, another silane compound may be simultaneously hydrolyzed and condensed in addition to the bissilane compound (B). With regard to such silane compound which may be used with the bissilane compound, the compounds as described below may be used at an amount which does adversely affect the intended properties. Exemplary such compounds include silicates such as tetraethoxy silane; epoxy functional alkoxysilanes such as γ-glycidoxy propyl trimethoxysilane and 3,4-epoxy cyclohexyl trimethoxysilane; amino functional alkoxysilanes such as γ-aminopropyltriethoxysilane and γ-(meth)acryloxy propyl trimethoxysilane; and mercapto functional alkoxysilanes such as γ-mercapto propyl trimethoxysilane; alkyl alkoxysilanes such as methyltrimethoxysilane, hexyltrimethoxysilane, and decyl trimethoxysilane; phenyl alkoxysilanes such as phenyltrimethoxysilane; and halogen-substituted alkylalkoxysilanes such as chloropropyl trimethoxysilane, trifluoropropyl trimethoxysilane, perfluorobutyl ethyltrimethoxysilane, perfluorooctyl ethyltrimethoxysilane; alkoxysilanes having a fluorine-containing substituent such as CF$_3$(CF$_2$)$_7$SO$_2$NH—C$_3$H$_6$—Si(OCH$_3$)$_3$, $CF_3(CF_2)_7CONH$—$C_3H_6$—$Si(OCH_3)_3$, and perfluoro polyether group-containing methoxy silane.

Among such silane compounds, the silane compound having a fluorine-substituted perfluoroalkyl group is most preferable for simultaneous use with the bissilane compound in view of the effect of reducing the refractive index and the ability of improving the alkali resistance. Such silane may be represented by the following general formula (C):

$$F(CF_2)_a C_2H_4\text{—}SiR_{3-b}X_b \quad (C)$$

wherein R and X are as defined above.

In the formula, "a" which determines the chain length of the perfluoroalkyl group is preferably 4, 6, 8, 10, or 12. When "a" is small than such value, content of the fluorine atom in the cured coating will be low, and the coating may suffer from a reduced alkali resistance. "b" which represents the number of group X capable of undergoing siloxane crosslinking is preferably 2 or 3. In order to increase crosslink density to thereby improve scratch resistance to a favorable level, b is preferably 3.

Examples of the non-limiting organosilicon compound substituted with fluorine atom satisfying the conditions as described above include
$CF_3(CF_2)_3C_2H_4$—$Si(OCH_3)_3$,
$CF_3(CF_2)_3C_2H_4$—$Si(OC_2H_5)_3$,
$CF_3(CF_2)_3C_2H_4$—$Si(CH_3)(OCH_3)_2$,
$CF_3(CF_2)_5C_2H_4$—$Si(OCH_3)_3$,
$CF_3(CF_2)_7C_2H_4$—$Si(OCH_3)_3$,
$CF_3(CF_2)_7C_2H_4$—$Si(OC_2H_5)_3$,
$CF_3(CF_2)_7C_2H_4$—$Si(CH_3)(OCH_3)_2$,
$CF_3(CF_2)_9C_2H_4$—$Si(OCH_3)_3$, and
$CF_3(CF_2)_{11}C_2H_4$—$Si(OCH_3)_3$.

Among these, the most preferred is
$CF_3(CF_2)_7C_2H_4$—$Si(OCH_3)_3$.

With regard to the silane compound which may be used with the bissilane compound, it may be used with the bissilane compound at the following ratio (ratio by weight).

The bissilane compound/the silane compound which may be used with the bissilane compound=75/25 to 100/0.

When the silane compound which may be used with the bissilane compound is used at an amount in excess of such range, crosslink density will be reduced, and the sufficient scratch resistance may not be realized. The content of the hydrophilic silane compound such as alkyl silicate, epoxy functional silane, (meth)acryl functional silane, mercapto functional silane, or amino functional silane is preferably 10% by weight or less, and most preferably 1% by weight or less in the total content of the silane compound which may be used with the bissilane compound. Preferably, use in excess of such amount is avoided since surface of the cured article or the cured coating becomes susceptible to wetting with water-soluble alkaline substance which invites surface deterioration by the alkaline attack. When the silane compound which may be used with the bissilane compound is incorporated, the ratio of the bissilane compound/silane compound which may be used with the bissilane compound is preferably 99.5/0.5 or less (with more silane compound which may be used with the bissilane compound).

The porous and/or hollow inorganic oxide fine particles and the organosilicon compound containing the bissilane compound may be used at a weight ratio of the inorganic oxide fine particles/the organosilicon compound of 10/90 to 60/40. When the ratio is below such range, the effect of reducing the refractive index will be insufficient, and the resulting coating will not exhibit favorable antireflection property. The ratio in excess of such range is also unpreferable since relative content of the binder will be insufficient and the inorganic oxide fine particles will not be sufficiently immobilized, and as a consequence, the coating will not exhibit satisfactory level of scratch resistance. The weight ratio is more preferably in the range of 20/80 to 50/50, and most preferably 30/70 to 45/55.

In addition, a hydrolyzable metallic compound may be used at the content that does not adversely affect the scratch resistance and the low refractive index (the antireflection property). Non-limiting exemplary such hydrolyzable metallic compounds include organic titanium esters such as tetrabutoxy titanium, tetra-i-propoxy titanium, dibutoxy(bis-2,4-pentanedionate) titanium, and di-i-propoxy(bis-2,4-pentanedionate) titanium, organic zirconium esters such as tetrabutoxy zirconium, tetra-i-propoxy zirconium, dibutoxy(bis-2,4-pentanedionate)zirconium, and di-i-propoxy(bis-2,4-pentanedionate)zirconium, alkoxy aluminium compounds such as aluminum triisopropoxide, aluminum chelate compound such as aluminum acetyl acetonate complex, hydrolyzable derivatives of Hf, V, Nb, Ta, Mo, W, Fe, Ru, Co, Rh, Ni, Zn, Ga, In, Ge, Sn, and the like. When improvement of the chemical resistance is desired, inclusion of a derivative of metals such as Zr and Hf is preferable.

In the present invention, the composite resin is produced by hydrolyzing and condensing the organosilicon compound containing the bissilane compound (B) in the presence of porous and/or hollow inorganic oxide fine particles (A) for integration. The hydrolysis and the condensation may be accomplished by any method commonly used in the art.

The hydrolysis and condensation may be carried out by the aid of a catalyst. Exemplary such catalysts include acids such as hydrochloric acid, nitric acid, acetic acid, and maleic acid; alkaline metal hydroxides such as NaOH and KOH; amine compounds and salts of an amine compound such as ammonia, triethylamine, dibutylamine, hexylamine, and octylamine; bases such as salts of quaternary ammonium such as benzyl triethyl ammonium chloride, tetramethylammonium hydroxide, and tetrabutyl pentanedionate hydroxide; fluorides such as potassium fluoride and sodium fluoride; metal salt of an organic carboxylic acid such as solid acidic catalyst or solid basic catalyst (for example, ion-exchange resin catalyst), iron-2-ethylhexoate, titanium naphthate, zinc stearate, and dibutyl tin acetate; organometallic compounds such as organotitanium ester such as tetrabutoxy titanium, tetra-i-propoxy titanium, dibutoxy(bis-2,4-pentanedionate) titanium, and di-i-propoxy(bis-2,4-pentanedionate) titanium; organozirconium ester such as tetrabutoxy zirconium, tetra-i-propoxy zirconium, dibutoxy(bis-2,4-pentanedionate)zirconium, and di-i-propoxy(bis-2,4-pentanedionate)zirconium; alkoxy aluminum compounds such as aluminum triisopropoxide; aluminum chelate compounds such as aluminum acetyl acetonate; aminoalkyl-substituted alkoxysilane such as γ-aminopropyltrimethoxysilane, γ-aminopropyltriethoxysilane, N-(β-aminoethyl)-γ-aminopropyltrimethoxysilane, and N-(β-aminoethyl)-γ-aminopropyltriethoxysilane, which may be used alone or in combination of two or more.

The catalyst as described above may be added at 0.01 to 10 parts by weight, and preferably at 0.1 to 5 parts by weight per 100 parts by weight of the organosilicon compound. When this amount is less than 0.01 parts by weight, an excessive time may be required before the completion of the reaction, and in some case, the reaction will not proceed. An amount in excess of 10 parts by weight is disadvantageous because of the cost, coloring of the reaction product, increase of the side reaction, and other instabilities.

The hydrolysis and condensation reactions are preferably conducted in a system diluted with a solvent. Exemplary solvents which may be used for such dilution include alcohols such as methanol, ethanol, propyl alcohol, isopropyl alcohol, n-butyl alcohol, isobutyl alcohol, sec-butyl alcohol, t-butyl alcohol, and diacetone alcohol; glycol ethers such as ethylene glycol monomethyl ether, ethylene glycol monoethyl ether, propylene glycol monomethyl ether, propylene glycol monoethyl ether, and propylene glycol monomethyl ether acetate; ethers such as dioxane and tetrahydrofuran; ketones such as acetone, methyl ethyl ketone, methyl isobutyl ketone, cyclohexanone, and acetyl acetone; esters such as ethyl acetate, butyl acetate, and ethyl acetoacetate; xylene; and toluene. While the solvent may be added at any amount, the amount of the solvent added may be adjusted so that the amount of the effective component in the solution is 0.5 to 50% by weight, and preferably 1 to 30% by weight.

The hydrolysis and condensation reactions may be accomplished by dispersing the porous and/or hollow inorganic oxide fine particles and the organosilicon compound containing the bissilane compound in an organic solvent, stirring the dispersion, adding the hydrolyzation catalyst if desired, and adding the hydrolyzation water. The amount of water used for the hydrolysis is preferably in the range of 0.3 to 10 molar amounts of the total molar amount of the hydrolyzable group (SiX) in the entire organosilicon compound. When the water used at an amount below such range, the hydrolysis may not be fully completed, and the crosslinking between the inorganic fine particles and the binder derived from the organosilicon compound may not be sufficient. On the other hand, use of the water in excess of such range may result in the whitening of the resulting coating due to insufficient volatilization of the water remaining in the coating solution. More preferably, the water is used at 0.5 to 5 molar amount. The entire amount of the organosilicon compound may be hydrolyzed at once in the presence of the inorganic oxide fine particles, or alternatively, the organosilicon compound may be hydrolyzed in small portions by dividing the reaction into multiple steps.

The important feature of the present invention is formation of the complex (composite resin) between the inorganic oxide fine particles and the hydrolysate of the organosilicon compound. In order to accomplish the object of the present invention, it is required that only 50% by weight or less of the inorganic oxide fine particles of the entire amount of the inorganic oxide fine particles used in the reaction is extracted from the resulting complex when the inorganic oxide fine particles are extracted from the resulting complex with water by the procedure described in the Example. Extraction of the inorganic oxide fine particles in excess of such amount indicates presence of excessive amount of the inorganic oxide fine particles that failed to bind to the binder component derived from the organosilicon compound, and presence of such non-bound inorganic oxide fine particles prevents formation of a homogeneously cured product, and the object of the present invention is not achieved. The amount of the inorganic oxide fine particles extracted in such extraction is more preferably up to 40% by weight, and most preferably up to 30% by weight.

Such extraction of the inorganic oxide fine particles is conducted for evaluating whether the inorganic oxide fine particles have formed a complex with the organosilicon compound that have undergone the hydrolysis and the condensation. While the inorganic oxide fine particles are hydrophilic, such particles become hydrophobic after forming a complex with the organosilicon compound, and when they are extracted with a mixture of water and an organic solvent which is incompatible with water, the inorganic oxide fine particles which failed to react with the organosilicon compound transfer into the water to be extracted.

The composition containing the composite resin of the present invention and an organic solvent can be used as a coating composition. This coating composition may have a silicon-containing or fluorine-containing surfactant added, and exemplary such surfactants include various polyether-modified silicone compounds, various fluorine-based surfactants sold by Sumitomo 3M (product name, Fluorad), DuPont (fluoroalkyl polyether), and Asahi Glass Co., Ltd. (product name, Surfron), and oligomers having SiOH terminal group produced by hydrolyzing and condensing solely a perfluorosilane. Among these, the most preferred is the oligomer having SiOH terminal group produced by hydrolyzing and condensing solely a perfluorosilane because the coating formed by applying the coating composition of the present invention having such surfactant added will have an improved smudge proof property and enable easy removal of both water-based and oil-based smudges formed, for example, by a water- and/or oil paint or oil-base felted marker as well as the fingerprint which is a typical oil-based smudge, and such effects can be highly durable. Such surfactant may be added at an amount in the range of 0.01 to 10% by weight in relation to the solid content in the coating agent, and addition at such an amount is effective in reliably realizing leveling property during the coating.

The coating composition of the present invention may also contain additional components as desired. Exemplary such components include organic and inorganic UV absorbents, and buffers such as acetic acid—sodium acetate and disodium hydrogenphosphate—citric acid used for controlling the system to a pH of 2 to 7 to for stability of the silanol group.

The antireflection coating formed on the surface of the substrate by using the coating composition of the present invention is typically controlled to a coating thickness of 0.01 nm to 0.5 μm. Particularly favorable antireflection property is realized when the coating is adjusted to an optical thickness of about 0.1 μm. The method used for coating the composition of the present invention on the surface of the substrate is not particularly limited, and exemplary methods include dipping, spin coating, flow coating, roll coating, spray coating, and screen printing. In view of easy control of the coating thickness, the preferred are dipping, spray coating, and roll coating, by which the coating is deposited to a predetermined thickness.

The coating agent of the present invention is coated on a transparent substrate of a synthetic resin. Any synthetic resin may be used as long as the resin has good optical properties. Non-limiting examples of such resin include polycarbonate resins, polyalkylene terephthalate resins such as polyethylene terephthalate (PET), cellulosic resins such as diacetyl cellulose, acetate butyrate cellulose, and triacetyl cellulose, acryl resins, polystyrene resins, polyimide resins, polyester resins, polyethersulfone resins, liquid crystalline resins such as polyallylate, polyurethane resins, polysulfone resins, polyetherketone resins, trimethyl pentene, polyvinyl norbornene, polyolefin resins such as cyclic structure-containing polyolefin resins, and combination of such resins. The most preferred are polycarbonate resins, polyalkylene terephthalate resins such as PET, and triacetyl cellulose resins, acrylic resins, and polyolefin resins. The transparent substrate may be either a molded articles, a plate, or a film. However, for ease of the coating procedure, the substrate is preferably a film.

The hard coating formed on the surface of the substrate by the coating composition of the present invention may be overlaid with an oil repellent coating. Various oil repellent anti-smudge coatings may be formed to thereby prevent deposition of oil-base smudges such as fingerprint during the use of the antireflection parts produced by the present invention and to facilitate easy removal of such smudges.

In addition, various functional coatings may be formed under the hard coating formed on the surface of the substrate by the coating composition of the present invention. Exemplary such functional coatings include a rigid protective layer formed for the purpose of improving scratch resistance, a highly refractive layer formed for improving antireflection property, and an electroconductive layer formed to prevent attaching of dust and the like or for an antistatic purpose, which may be formed alone or in combination of two or more.

When the transparent substrate coated with the coating composition of the present invention is used as an antireflection parts having excellent scratch resistance as well as chemical resistance, such parts may be used by adhering to another transparent substrate. In order to enable such use by adhering to another substrate, the substrate may have a pressure-sensitive adhesive applied on the side opposite to the side on which the coating agent has been applied. Exemplary such pressure-sensitive adhesives include conventional acrylic, epoxy, polyimide, and silicone adhesives which are known in the art, and the most preferred are acrylic and silicone adhesives. The adhesive layer may be deposited to a thickness in the range of 1 to 500 μm. Adhesion will be insufficient when this layer is too thin, and deposition of an excessively thick adhesive layer is economically disadvantageous. A protective plastic sheet may be further provided on the transparent substrate.

EXAMPLES

Next, the present invention is described in detail by referring to the Examples and Comparative Examples, which by no means limit the scope of the present invention. In the following Examples, "%" refers to "% by weight", and "part" refers to "part by weight". Also, in the present invention, "average molecular weight" is the number average molecular weight in terms of polystyrene determined in gel permeation chromatography (hereinafter referred to as GPC).

Example 1

To a 3 liter flask equipped with a stirrer, a condenser, and a thermometer, 100 g of the bissilane compound (A) as described below, 200 g of hollow silica fine particles sol (a dispersion of a hollow silica having an average particle diameter of 60 nm and a shell thickness of 10 nm in isopropanol having a silica concentration of 20%), and 1 g of cation-exchange resin were added, and the mixture was stirred at 25° C. 40 g of water was added to this mixture in 10 minutes, and the mixture was further stirred at 40° C. for 6 hours to complete the hydrolysis and condensation. This solution was diluted with ethanol until the involatile content was 4%, and a cation-exchange resin was separated by filtration. 0.1 g of polyether-modified silicone and 1 g of aluminum acetoacetate were added to thereby prepare the coating solution (1).

The procedure as described above was repeated by using 100 g of isopropanol instead of the bissilane compound (A) to prepare solution (1)-N containing only the hollow silica sol.

10 g of the solution prepared as described above was placed in a clean glass bottle, and 20 g of methyl isobutyl ketone and 50 g of ion exchanged water were added. The bottle was shaken for 10 minutes in a shaker to extract hydrophilic silica content and measure involatile content of the aqueous phase to thereby compare the results. When the solution (1)-N was used, 100% of the of the charged hydrophilic silica was extracted whereas only 13% of the charged hydrophilic silica was extracted in the case of the solution (1). This result confirmed that, in the case of the solution (1), most of the hollow silica sol fine particles condensed and integrated with the hydrolysate of the bissilane compound to form a composite resin.

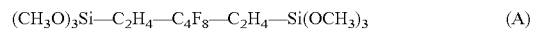

(CH$_3$O)$_3$Si—C$_2$H$_4$—C$_4$F$_8$—C$_2$H$_4$—Si(OCH$_3$)$_3$     (A)

Comparative Example 1

Hydrolysis and condensation of Example 1 were repeated without using the hollow silica fine particle sol. After the reaction, the hollow silica fine particle sol of the same amount as Example 1 was added to prepare coating solution (2).

As in the case of Example 1, the test of extracting the hydrophilic silica content was conducted. The extraction rate was 97% indicating that mere addition of the hollow silica fine particle sol did not result in the binding and integration of the binder component and the hollow silica fine particles.

Examples 2 to 6 and Comparative Examples 2 to 3

Coating solutions were prepared by repeating the procedure of Example 1 and changing the silane compound.

The details are described in Table 1.

The silane compound, the anti-smudge agent, the leveling agent, and the like were as described below.

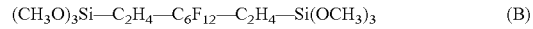

(CH$_3$O)$_3$Si—C$_2$H$_4$—C$_6$F$_{12}$—C$_2$H$_4$—Si(OCH$_3$)$_3$     (B)

C$_8$F$_{17}$C$_2$H$_4$—Si(OCH$_3$)$_3$     (C)

Si(OC$_2$H$_5$)$_4$     (D)

(E) Anti-smudge agent: 20% alcohol solution of a silicone resin containing SiOH group having a molecular weight of 1,600 prepared by hydrolyzing and condensing C$_8$F$_{17}$C$_2$H$_4$—Si(OCH$_3$)$_3$ (F) Leveling agent: polyether-modified silicone:

(G) Zr compound: Zr(OC$_4$H$_9$)$_4$

In the Examples, the physical properties were measured and evaluated by the procedure as described below.

[Coating Method]

Coating Method

The layers as described below were coated by dipping to a predetermined thickness on the glass plate having the surface cleaned.

(I) High Refractivity Layer

Silicone coating agent X-12-2170 manufactured by Shin-Etsu Chemical Co., Ltd. which would produce a cured coating having a refractive index of 1.68 was used. This silicone coating agent was coated by dipping so that the resulting cured coating would have a thickness of 0.1 μm, and after air drying for 10 minutes, it was retained in a hot air oven at 120° C. for 60 minutes for curing of the coating.

(II) A Cured Coating the Coating Agent of the Present Invention

After forming the layer (I), the coating solution of the present invention was coated by dipping.

The coating was coated to an optical thickness such that the cured coating would have a thickness of about 0.1 μm, and the coating would exhibit the minimum reflectivity in the wavelength range of 500 to 600 nm when measured by a spectrophotometer.

After the coating, the coating was air dried for 10 minutes, and it was retained in a hot air oven at 120° C. for 60 minutes for curing of the coating.

Scratch Resistance (Method-1)

0000 steel wool was mounted on a reciprocal scratch tester (manufactured by KNT Co., Ltd.), and the steel wool was moved back and forth 10 times under a load of 500 g/cm², and the number of scratches on the surface was counted.

<Criteria>
0: A
1 to 2: B
3 to 5: C
5 or more: D

Chemical Resistance 1 drop of 0.1N (0.4%) aqueous NaOH was placed on the coating, and after allowing to stand 1 whole day, the chemical reagent was removed to observe the surface with naked eye.

<Criteria>
No change: A
The marks is partially left: B
Dissolution of the coating: C Antireflection Property Reflectivity was measured by a spectrophotometer, and the minimum value of the reflectivity in the wavelength range of 500 to 600 nm was used as minimum reflectivity.

Smudge Proof Property

Fingerprint was formed on the surface, and the part where the finger print had been formed was wiped by moving a tissue paper back and forth 10 times. The initial smudge proof property was evaluated by the degree of remaining fingerprint according to the following criteria.

The surface was further wiped with an absorbent cotton having acetone impregnated therein by moving the absorbent cotton back and forth 10 times. The smudge proof property was evaluated again, and the results are indicated as enduring smudge proof property.

<Criteria>
No fingerprint left: A
The fingerprint partially remained: B
The fingerprint mostly remained: C Oil Repellency Contact angle with oleic acid was measured according to JIS R 3257:1999.

Japanese Patent Application No. 2006-112095 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A coating composition comprising
a composite resin which has been produced by hydrolyzing and condensing a silane compound (2) containing a bissilane compound (B) represented by:

$$X_n R_{3-n} Si\text{—}Y\text{—}SiR_{3-n} X_n \quad (B)$$

wherein Y is a divalent organic group which is optionally substituted with a fluorine atom or a divalent organic group which optionally contains an aromatic ring, R is a monovalent organic group, X is OH group or a hydrolyzable group, and n is 1, 2, or 3; in the presence of (1) porous and/or hollow inorganic oxide fine particles (A) wherein the porous and/or hollow inorganic oxide fine particles and the organosilicon compound containing the bissilane compound is used at a weight ratio of the inorganic oxide fine particles/the organosilicon compound of 10/90 to 60/40; and which is an integral mixture of component (1) and component (2) which has undergone the hydrolysis and the condensation, and an organic solvent.

2. A coated article having the coating composition of claim 1 coated as its outermost layer.

3. The coating composition according to claim 1 wherein Y in the formula (1) is a straight chain, branched, or cyclic alkylene group containing 1 to 10 carbon atoms; a fluorine-containing straight chain, branched, or cyclic alkylene group containing 6 to 20 carbon atoms; an arylene group containing 6 to 20 carbon atoms; and an aromatic ring-containing divalent hydrocarbon group.

4. The coating composition according to claim 1 wherein the inorganic oxide fine particles (A) contain SiO₂ as a main component.

TABLE 1

|  |  | Examples |  |  |  |  |  | Comparative Examples |  |  |
|---|---|---|---|---|---|---|---|---|---|---|
|  |  | 1 | 2 | 3 | 4 | 5 | 6 | 1 | 2 | 3 |
| Starting material (parts by weight) | Silane (A) | 100 |  | 90 | 100 | 60 | 90 | 100 | 100 | 80 |
|  | Silane (B) |  | 100 |  |  |  |  |  |  |  |
|  | Silane (C) |  |  | 10 |  |  |  |  |  |  |
|  | Silane (D) |  |  |  |  |  |  |  |  | 20 |
|  | Anti-smudge agent (E) |  |  |  | 1 | 1 | 1 |  |  |  |
|  | Levelling agent (F) | 0.1 | 0.1 | 0.1 |  |  |  | 0.1 | 0.1 | 0.1 |
|  | Zr compound (G) |  |  |  |  |  | 10 |  |  |  |
|  | Hollow silica sol | 200 | 200 | 200 | 200 | 200 | 200 | 200 | 0 | 200 |
| Production method | Complexing | B | B | B | B | B | B |  |  | B |
|  | Addition |  |  |  |  |  |  | B |  |  |
| Coating properties | Scratch resistance | A | A | B | A | A | B | D | C–D | A |
|  | Chemical resistance | B | B | B | B | B | B | C | B | D |
|  | Antireflection property | 0.1 | 0.1 | 0.1 | 0.1 | 0.1 | 0.1 | 0.1 | 0.6 | 0.2 |
|  | Initial smudge proof property | B | B | B | B | B | B | C | B | D |
|  | Enduring smudge proof property | B–C | B–C | B | B | B | B | D | B–C | D |
|  | Contact angle with oleic acid (°) | 63 | 64 | 69 | 73 | 75 | 74 | 58 | 65 | 56 |

5. The coating composition according to claim 1 wherein the inorganic oxide fine particles (A) have an average particle diameter of 1 to 100 μm.

6. The coating composition according to claim 1 wherein the bissilane compound (B) is the one represented by the following formula:

$$(CH_3O)_3Si-CH_2CH_2-C_mF_{2m}-CH_2CH_2-Si(OCH_3)_3$$

wherein m is an integer of 2 to 20.

7. The coating composition according to claim 1 wherein the bissilane compound (B), and
a silane compound represented by the following general formula (C):

$$F(CF_2)_aC_2H_4-SiR_{3-b}X_b \quad (C)$$

wherein R and X are as described above, a is 4, 6, 8, 10, or 12, and b is 2 or 3
are simultaneously hydrolyzed and condensed in the presence of an inorganic oxide fine particles (A).

8. The coating composition of claim 1, wherein the inorganic oxide fine particles have a refraction index of 1.20 to 1.44.

9. The coating composition of claim 1, wherein the inorganic oxide fine particles have an outer shell with a thickness in the range of 0.1 to 30 nm.

10. The coating composition of claim 1, wherein the inorganic oxide fine particles are bound to a binder component derived from the organosilicon compound in an amount greater than 50% by weight.

11. The coating composition of claim 1 having a thickness of 0.01 nm to 0.5 μm.

12. The composition of claim 1 wherein the porous and/or hollow inorganic oxide fine particles and the organosilicon compound containing the bissilane compound is used at a weight ratio of the inorganic oxide fine particles/the organosilicon compound of 30/70 to 60/40.

13. A coating composition comprising
a composite resin which has been produced by hydrolyzing and condensing a silane compound (2) consisting of a bissilane compound (B) represented by:

$$X_nR_{3-n}Si-Y-SiR_{3-n}X_n \quad (B)$$

wherein Y is a divalent organic group which is optionally substituted with a fluorine atom or a divalent organic group which optionally contains an aromatic ring, R is a monovalent organic group, X is OH group or a hydrolyzable group, and n is 1, 2, or 3, and
a silane compound represented by the following general formula (C):

$$F(CF_2)_aC_2H_4-SiR_{3-b}X_b \quad (C)$$

wherein R and X are as described above, a is 4, 6, 8, 10, or 12, and b is 2 or 3, the bissilane compound/the silane compound being used in the ratio by weight of 75/25 to 100/0,
in the presence of (1) porous and/or hollow inorganic oxide fine particles (A) wherein the porous and/or hollow inorganic oxide fine particles and the organosilicon compound containing the bissilane compound are used in a weight ratio of the inorganic oxide fine particles/the organosilicon compound of 10/90 to 60/40; and which is an integral mixture of component (1) and component (2) which has undergone the hydrolysis and the condensation, and
an organic solvent.

14. A coating composition consisting essentially of
a composite resin which has been produced by hydrolyzing and condensing a silane compound (2) consisting of a bissilane compound (B) represented by:

$$X_nR_{3-n}Si-Y-SiR_{3-n}X_n \quad (B)$$

wherein Y is a divalent organic group which is optionally substituted with a fluorine atom or a divalent organic group which optionally contains an aromatic ring, R is a monovalent organic group, X is OH group or a hydrolyzable group, and n is 1, 2, or 3, and
a silane compound represented by the following general formula (C):

$$F(CF_2)_aC_2H_4-SiR_{3-b}X_b \quad (C)$$

wherein R and X are as described above, a is 4, 6, 8, 10, or 12, and b is 2 or 3, the bissilane compound/the silane compound being used in the ratio by weight of 75/25 to 100/0,
in the presence of (1) porous and/or hollow inorganic oxide fine particles (A) wherein the porous and/or hollow inorganic oxide fine particles and the organosilicon compound containing the bissilane compound are used at a weight ratio of the inorganic oxide fine particles/the organosilicon compound of 10/90 to 60/40; and
which is an integral mixture of component (1) and component (2) which has undergone the hydrolysis and the condensation,
an organic solvent, and
optionally at least one component selected from the group consisting of a silicon-containing or fluorine-containing surfactant, an organic or inorganic UV absorbent, and a buffer.

* * * * *